(12) United States Patent
Seki et al.

(10) Patent No.: US 10,804,833 B2
(45) Date of Patent: Oct. 13, 2020

(54) CONTROL DEVICE FOR ELECTRIC GENERATOR/MOTOR AND CONTROL METHOD FOR ELECTRIC GENERATOR/MOTOR

(71) Applicant: Mitsubishi Electric Corporation, Tokyo (JP)

(72) Inventors: Tomohiro Seki, Tokyo (JP); Yuya Hisano, Tokyo (JP); Ryo Nakamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/336,174

(22) PCT Filed: Nov. 2, 2016

(86) PCT No.: PCT/JP2016/082603
§ 371 (c)(1),
(2) Date: Mar. 25, 2019

(87) PCT Pub. No.: WO2018/083758
PCT Pub. Date: May 11, 2018

(65) Prior Publication Data
US 2019/0253012 A1    Aug. 15, 2019

(51) Int. Cl.
*H02P 21/22* (2016.01)
*F02N 11/08* (2006.01)
(Continued)

(52) U.S. Cl.
CPC .............. *H02P 21/22* (2016.02); *F02D 29/06* (2013.01); *F02N 11/08* (2013.01); *H02P 6/32* (2016.02);
(Continued)

(58) Field of Classification Search
CPC .. H02P 2101/25; H02P 2101/45; H02P 21/22; H02P 6/32; H02P 9/08; H02P 9/48; F02D 29/06; F02N 11/08
(Continued)

(56) References Cited

U.S. PATENT DOCUMENTS

2005/0073279 A1 * 4/2005 Fenley .................. F02D 41/083
318/717
2010/0072958 A1    3/2010 Wada et al.
2015/0019059 A1    1/2015 Tabata et al.

FOREIGN PATENT DOCUMENTS

EP       1717944 A1 * 11/2006 .............. H02P 9/305
JP    2007-006639 A    1/2007
(Continued)

OTHER PUBLICATIONS

Communication dated Sep. 19, 2019, from the European Patent Office in counterpart European Application No. 16920765.1.
(Continued)

*Primary Examiner* — Charles Reid, Jr.
(74) *Attorney, Agent, or Firm* — Sughrue Mion, PLLC; Richard C. Turner

(57) ABSTRACT

Provided is a control device for an electric generator/motor, which includes an armature winding and a field winding, the control device including: a bridge circuit configured to energize the armature winding; a field circuit configured to energize the field winding; and an energization control unit configured to control the energization of the bridge circuit and the field circuit. The energization control unit is configured to perform, when performing switching between a generation mode and a drive mode in response to an external command to control the electric generator/motor, control on a current supply amount for the field winding, and vector
(Continued)

control on a current supply amount for the armature winding so as to compensate for a variation in field current.

5 Claims, 5 Drawing Sheets

(51) Int. Cl.
<table>
<tr><td>H02P 9/08</td><td>(2006.01)</td></tr>
<tr><td>H02P 6/32</td><td>(2016.01)</td></tr>
<tr><td>H02P 9/48</td><td>(2006.01)</td></tr>
<tr><td>F02D 29/06</td><td>(2006.01)</td></tr>
<tr><td>H02P 101/45</td><td>(2016.01)</td></tr>
<tr><td>H02P 101/25</td><td>(2016.01)</td></tr>
</table>

(52) U.S. Cl.
CPC .................. *H02P 9/08* (2013.01); *H02P 9/48* (2013.01); *H02P 2101/25* (2015.01); *H02P 2101/45* (2015.01)

(58) Field of Classification Search
USPC .................................................. 290/31, 38 R
See application file for complete search history.

(56) References Cited

FOREIGN PATENT DOCUMENTS

| | | |
|---|---|---|
| JP | 2008-180105 A | 8/2008 |
| JP | 2015-067225 A | 4/2015 |

OTHER PUBLICATIONS

International Search Report for PCT/JP2016/082603 dated Jan. 24, 2017 [PCT/ISA/210].

* cited by examiner

CONTROL DEVICE FOR ELECTRIC GENERATOR/MOTOR AND CONTROL METHOD FOR ELECTRIC GENERATOR/MOTOR

TECHNICAL FIELD

The present invention relates to a control device for an electric generator/motor and a control method for an electric generator/motor, the electric generator/motor being mainly mounted on a vehicle, and including an armature winding and a field winding to operate as an electric motor when starting and torque-assisting an engine, and also as an electric generator after the starting.

BACKGROUND ART

In recent years, for the purposes of improving fuel consumption and complying with environmental standards, there have been developed vehicles each having an electric generator/motor mounted thereon and being configured to perform so-called "idle reduction", in which an engine is stopped when the vehicle is stopped and the engine is restarted when the vehicle starts. It is required for such an electric generator/motor for a vehicle to have a small size, reduced cost, and high torque. Therefore, as the electric generator/motor for a vehicle, a wound-field electric generator/motor is often used.

The electric generator/motor for a vehicle generally operates while performing switching between a generation mode and a drive mode. In the generation mode, control is performed only on a current supply amount for a field winding without being performed on a current supply amount for an armature winding, and a DC current is supplied to the vehicle through diode rectification. In the drive mode, control is performed on the current supply amount for the field winding, and vector control is performed on the current supply amount for the armature winding, to thereby generate drive torque.

It is required for the wound-field electric generator/motor, which is configured to perform the above-mentioned operation, to cause a large electric current to flow through the armature winding. Therefore, the wound-field electric generator/motor for a vehicle is designed so that the field winding has an inductance that is larger than an inductance of the armature winding. As a result, a time constant of a field current is larger than a time constant of an armature current. Therefore, when energization commands for the armature winding and the field winding are changed simultaneously, a speed of response of the field current is lower than a speed of response of the armature current to cause a difference between a field current command value and the actual field current.

When such a delay in response of the field current occurs at the time of switching between the generation mode and the drive mode, magnitudes of torque before and after switching from a generating side to a drive side, or from the drive side to the generating side cannot be controlled. As a result, unintended torque is generated to apply excessive forces on a belt and the engine, with the result that the belt may be worn out and engine control may become unstable.

To address the above-mentioned problem, there has been proposed a technology in which a period in which target torque is zero is provided in a process of switching between the generation mode and the drive mode to suppress an abrupt variation in torque, to thereby prevent the wearing out of the belt and improve ride comfort (see Patent Literature 1, for example).

CITATION LIST

Patent Literature

[PTL 1] JP 2015-0627225 A

SUMMARY OF THE INVENTION

Technical Problem

However, the related-art technology has the following problem.

In a case where the above-mentioned control is performed, when it is desired to switch the mode quickly, for example, when it is desired to generate electricity to suppress a reduction in battery voltage immediately after the engine is driven for cranking, the electricity cannot be generated in the period in which the target torque is zero. As a result, control on an electrical load of the vehicle may be affected.

As described above, switching control described in Patent Literature 1 has a problem in that quick transition to the next mode cannot be performed after the drive of the engine is stopped.

The present invention has been made to solve the above-mentioned problem, and therefore has an object to provide a control device for an electric generator/motor and a control method for an electric generator/motor, with which quick mode transition can be performed while suppressing an abrupt variation in torque during switching between a generation mode and a drive mode, and without being limited by a time constant of a field current.

Solution to Problem

According to one embodiment of the present invention, there is provided a control device for an electric generator/motor, which includes an armature winding and a field winding, the control device including: a bridge circuit, which includes a switching element in a positive-side arm and a switching element in a negative-side arm to energize the armature winding; a field circuit configured to energize the field winding; and an energization control unit configured to control the energization of the bridge circuit and the field circuit, the electric generator/motor having two modes including a generation mode of generating electricity by being supplied with torque from a vehicle to supply electric power to an electrical load of the vehicle and to charge a battery, and a drive mode of generating drive torque by being supplied with electric power from the battery to restart and assist an engine, the energization control unit being configured to perform, when performing mode switching between the generation mode and the drive mode in response to an external command, control on a current supply amount for the field winding, and vector control on a current supply amount for the armature winding so as to compensate for a variation in field current flowing through the field winding.

According to another embodiment of the present invention, there is provided a control method for an electric generator/motor, the control method being applied to controlling a wound-field electric generator/motor including an armature winding and a field winding, and being used in executing switching control between two modes by an energization control unit, the two modes including a generation mode of generating electricity by being supplied with torque from a vehicle to supply electric power to an electrical load of the vehicle and to charge a battery, and a drive mode of generating drive torque by being supplied with electric power from the battery to restart and assist an engine, the control method including, when mode switching is performed between the generation mode and the drive mode in response to an external command in the energization control unit: a first step of executing control on a current supply amount for the field winding; and a second step of performing, along with the control in the first step, vector control on a current supply amount for the armature winding so as to compensate for a variation in field current flowing through the field winding.

Advantageous Effects of Invention

According to the one embodiment of the present invention, there is provided a configuration in which, at the time of switching between the generation mode and the drive mode of the electric generator/motor, the current supply amount for the armature winding is controlled by preventing the field current flowing through the field winding from becoming zero. As a result, there can be provided the control device for an electric generator/motor and the control method for an electric generator/motor, with which the quick mode transition can be performed while suppressing the abrupt variation in torque during the switching between the generation mode and the drive mode, and without being limited by the time constant of the field current.

DESCRIPTION OF EMBODIMENTS

Now, a control device for an electric generator/motor and a control method for an electric generator/motor according to preferred embodiments of the present invention are described with reference to the drawings.

First Embodiment

Figure 1:
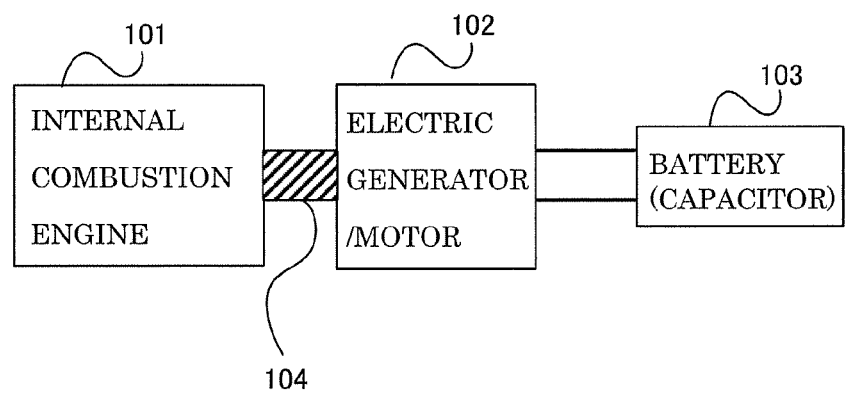
FIG. 1 is a configuration diagram of an entire system including a control device for a wound-field electric generator/motor according to a first embodiment of the present invention which may be mounted on a vehicle.

FIG. 1 is a configuration diagram of an entire system including a control device for a wound-field electric generator/motor according to a first embodiment of the present invention which may be mounted on a vehicle. In FIG. 1, an internal combustion engine 101 for the vehicle is coupled to an electric generator/motor 102 by a power transmission unit 104 via a shaft or a pulley and belt under a state in which torque is transmittable/receivable therebetween. Moreover, the electric generator/motor 102 is electrically connected to a battery or capacitor 103.

The electric generator/motor 102 has a drive mode and a generation mode. In the drive mode, the electric generator/motor 102 operates as an electric motor configured to start and assist the internal combustion engine 101 for the vehicle in response to a command from a host engine control device, which is not shown in FIG. 1. In the generation mode, the electric generator/motor 102 operates as an electric generator configured to supply electric power to an electrical load of the vehicle or charge the battery 103.

The battery or capacitor may be shared with another vehicle load, or may be dedicated to the electric generator/motor 102.

Figure 2:
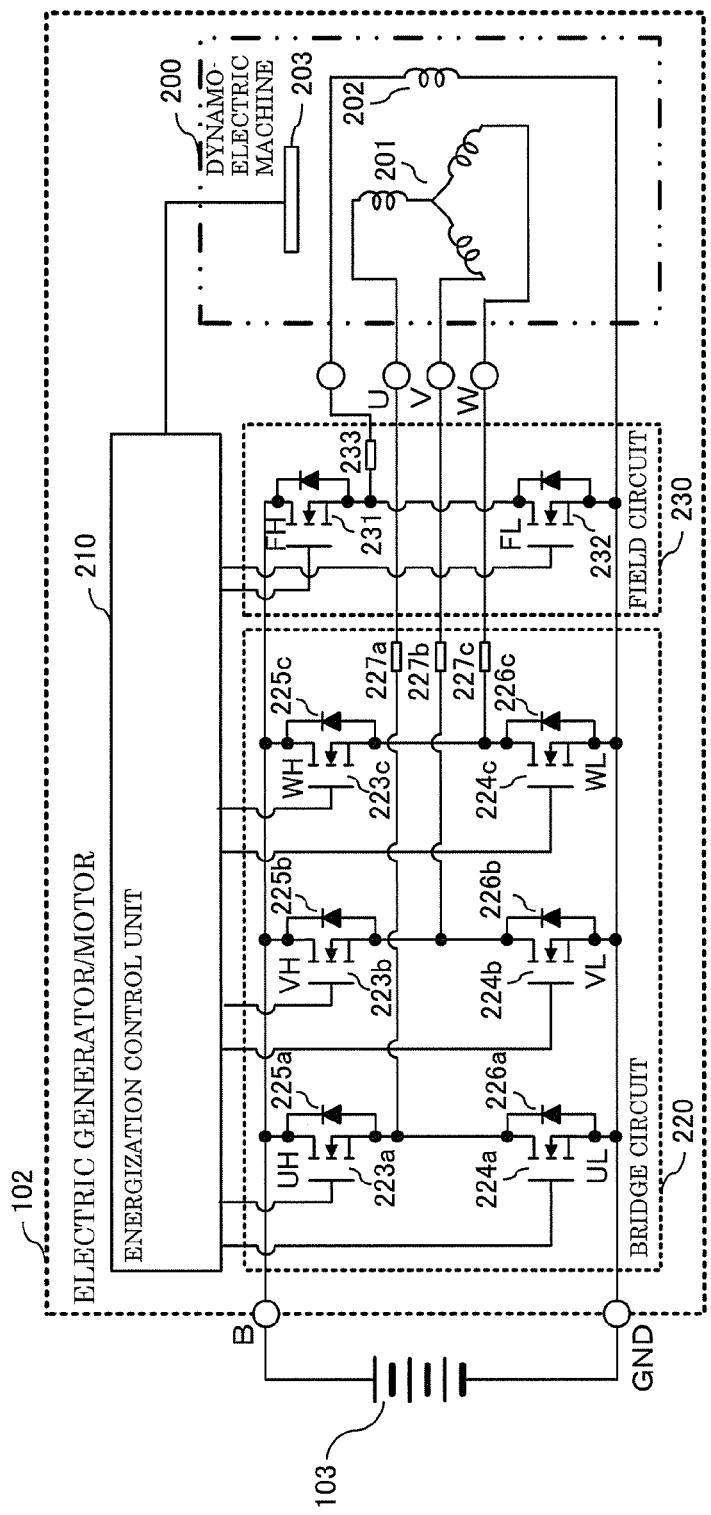
FIG. 2 is a block diagram for illustrating a configuration of an electric generator/motor 102 in the first embodiment of the present invention.

FIG. 2 is a block diagram for illustrating a configuration of the electric generator/motor 102 in the first embodiment of the present invention. In FIG. 2, the electric generator/motor 102 includes a dynamo-electric machine 200, an energization control unit 210, a bridge circuit 220, and a field circuit 230.

The energization control unit 210 is configured to control the bridge circuit 220 and the field circuit 230, and energize an armature winding 201 and a field winding 202 of the dynamo-electric machine 200, to thereby achieve a function as the electric motor and a function as the electric generator of the electric generator/motor 102.

The dynamo-electric machine 200 includes the armature winding 201 and the field winding 202, each of which is energized to generate torque for starting and assisting the internal combustion engine 101, or generate an electric current for charging the battery. The dynamo-electric machine 200 further includes a rotational position sensor 203, for example, an encoder or a resolver.

The bridge circuit 220 includes a three-phase inverter circuit, a three-phase bridge rectifier circuit, and armature current sensors 227a to 227c. The three-phase inverter circuit includes upper-arm switching elements 223a to 223c and lower-arm switching elements 224a to 224c, which are formed of switching elements, for example, MOSFETs (Metal-Oxide-Semiconductor Field Effect Transistors) or IGBTs (Insulated Gate Bipolar Transistors), and are connected in a three-phase bridge format.

Moreover, the three-phase bridge rectifier circuit is formed of upper-arm diodes 225a to 225c and lower-arm diodes 226a to 226c, which are inverse-parallel connected to the respective switching elements. Further, the armature current sensors 227a to 227c are configured to detect an armature current flowing from the respective phases to the armature winding 201.

The energization control unit 210 is configured to execute control to turn on/off each of the switching elements forming the bridge circuit 220 in accordance with an energization signal, to thereby perform energization control on the armature winding 201.

In FIG. 2, the upper-arm diodes 225a to 225c and the lower-arm diodes 226a to 226c are described as independent elements. However, parasitic diodes that are present in the upper-arm switching elements 223a to 223c and the lower-arm switching elements 224a to 224c may be used instead of those diodes.

Moreover, the field circuit 230 is formed of an upper-arm switching element 231 and a lower-arm switching element 232, and a field current sensor 233 configured to detect an electric current flowing through the field winding 202. Further, the energization control unit 210 is configured to execute control to turn on/off each of the switching elements forming the field circuit 230 in accordance with an energization signal, to thereby perform energization control on the field winding 202.

In FIG. 2, the dynamo-electric machine 200 is exemplified as a three-phase wound-field AC dynamo-electric machine including the three-phase armature winding 201 and the field winding 202. It should be noted, however, that a winding method and the number of phases of the wound-field AC dynamo-electric machine may be different from those of the configuration of FIG. 2.

Next, operation during mode switching of the control device for an electric generator/motor in the present invention is described in detail with reference to the drawings. A case is assumed in which a generation mode command is given from the host engine control device when the electric generator/motor is operating in the drive mode for restarting and torque-assisting an engine.

In this case, the energization control unit 210 calculates control command values in the generation mode on the basis of a torque command value TRQref, which is given from the host engine control device, a B-terminal voltage VB, which is a control state, and a rotation speed NMG.

The electric generator/motor described in the first embodiment has a technical feature in that vector control on the armature current is continued without stopping the energization to the armature winding 201 during the mode switching from the drive mode to the generation mode.

Figure 3:
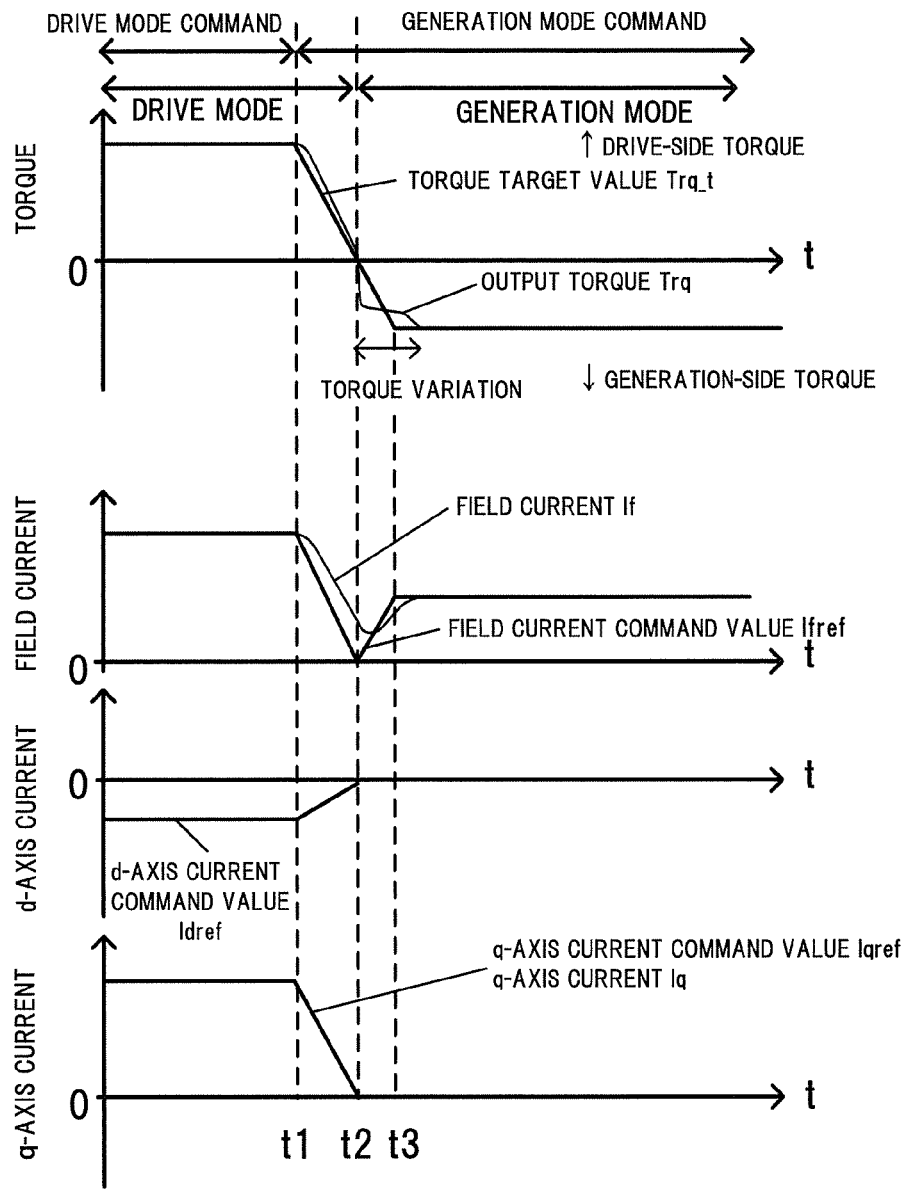
FIG. 3 is a graph for showing transitions with time of values of respective parts when a switching operation from a drive mode to a generation mode is performed in a related-art control device for an electric generator/motor.

FIG. 3 is a graph for showing transitions with time of values of respective parts when a switching operation from the drive mode to the generation mode is performed in a related-art control device for an electric generator/motor. In contrast, FIG. 4 is a graph for showing transitions with time of values of respective parts when a switching operation from the drive mode to the generation mode is performed in the control device for the electric generator/motor according to the first embodiment of the present invention.

Figure 4:
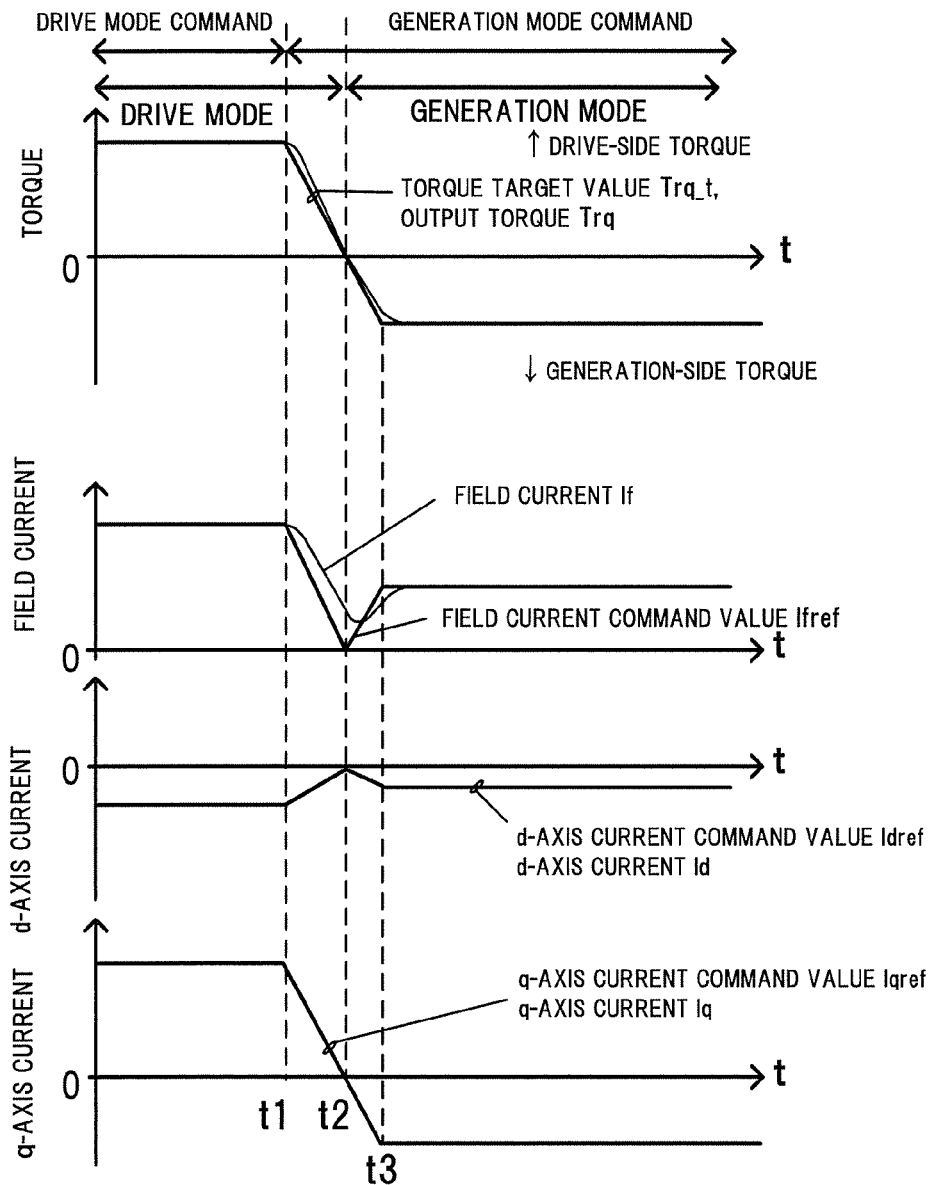
FIG. 4 is a graph for showing transitions with time of values of respective parts when a switching operation from a drive mode to a generation mode is performed in the control device according to the first embodiment of the present invention.

Specifically, in FIG. 3 and FIG. 4, command values and output values of the electric generator/motor are shown for torque, a field current, a d-axis current, and a q-axis current.

In a mode switching operation for the related-art control device shown in FIG. 3, at a moment of switching from the drive mode to the generation mode, which corresponds to time t2 in FIG. 3, energization to the armature winding is stopped. Therefore, at and after time t2, a torque error, that is, a torque variation caused by a delay of a field current If from a field current command value Ifref is generated.

Meanwhile, in a mode switching operation for the electric generator/motor in the first embodiment, energization to the armature winding 201 is continued after switching to the generation mode, which corresponds to time t2 and subsequent times in FIG. 4. In other words, the energization control unit 210 also controls generation torque by controlling the armature current at and after time t2.

The energization control unit 210 can perform control with which a torque error is not generated by giving a d-axis current command value Idref and a q-axis current command value Iqref to the bridge circuit 220 so as to compensate for a delay of the field current If from the field current command value Ifref.

Moreover, in performing the mode switching from the generation mode to the drive mode, the energization control unit 210 starts the vector control on the armature current when a drive mode command is given. With the above-mentioned control, the energization control unit 210 can perform control with which the torque error is not generated by giving the d-axis current command value Idref and the q-axis current command value Iqref to the bridge circuit 220 so as to compensate for the delay of the field current If from the field current command value Ifref as in the switching from the drive mode to the generation mode.

As described above, according to the first embodiment, there is provided the configuration in which a current supply amount for the armature winding is controlled so as to compensate for the delay of the field current from the field current command value, which is caused during the mode switching, on the basis of a generation torque command value and the present field current. As a result, it is possible to implement the control device for an electric generator/motor with which the torque variation caused by the difference between the field current and the field current command value can be suppressed.

Second Embodiment

In a second embodiment of the present invention, a description is given of a specific example in which the field current command value is different as compared to the first embodiment described above. A control operation in the second embodiment is similar to that in the first embodiment described above except for an operation of the energization control unit 210 during the mode switching, and the difference is mainly described below.

Figure 5:
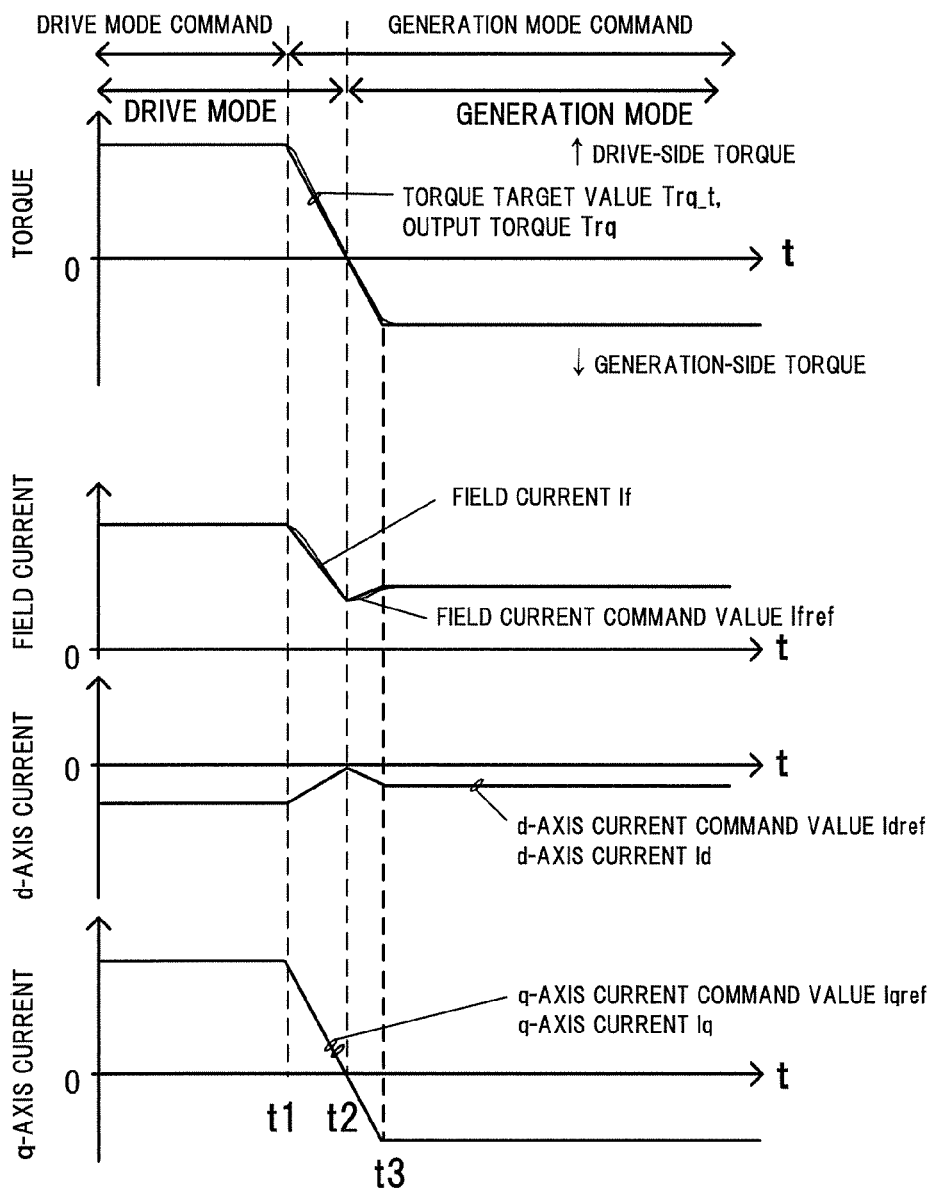
FIG. 5 is a graph for showing transitions with time of values of respective parts when a switching operation from a drive mode to a generation mode is performed in a control device according to a second embodiment of the present invention.

FIG. 5 is a graph for showing transitions with time of values of respective parts when a switching operation from a drive mode to a generation mode is performed in a control device for an electric generator/motor according to the second embodiment of the present invention. Specifically, in FIG. 5, command values and output values from the electric generator/motor are shown for torque, a field current, a d-axis current, and a q-axis current.

The energization control unit 210 in the second embodiment has a further technical feature in that a field current command value Ifref at the time of switching from the drive mode to the generation mode is changed in accordance with a time constant of the field winding. Therefore, no delay occurs between the field current command value Ifref and a field current If.

Further, as in the first embodiment described above, the energization control unit 210 in the second embodiment is configured to control a current supply amount for the armature winding so as to compensate for a delay of the field current from the field current command value, which is caused during the mode switching, on the basis of a generation torque command value Tref and the present field current If.

In the specific example of FIG. 5, the energization control unit 210 controls output torque with a d-axis current command value Idref and a q-axis current command value Iqref such that energization to the armature winding 201 is continued after the switching to the generation mode, which corresponds to time t2 and subsequent times. As a result, no torque error is generated.

Moreover, as compared to FIG. 4 in the first embodiment described above, in the case of the field current in FIG. 5, the field current command value Ifref at the time of switching from the drive mode to the generation mode is changed in accordance with the time constant of the field winding so that, as a result, the field current is prevented from becoming zero, with the result that control on a current supply amount for the field circuit and vector control on the current supply amount for the armature winding can be performed during mode switching by preventing the field current from becoming zero.

As described above, according to the second embodiment, there is provided the configuration in which the current supply amount for the armature winding is controlled so as to compensate for the delay of the field current from the field current command value, which is caused during the mode switching, on the basis of the generation torque command value and the present field current. Further, in the second embodiment, there is also provided the configuration in which the field current command value during the mode switching is changed in accordance with the time constant of the field winding. As a result, it is possible to implement the control device for an electric generator/motor with which a torque variation caused by the difference between the field current and the field current command value can be suppressed.

In the first embodiment and the second embodiment described above, the vector control on the armature current is described to be performed on d-q coordinates. However, the present invention is not limited to such control on the d-q coordinates, and control may be performed on three-phase coordinates or other rotational coordinates.

Moreover, in the first embodiment and the second embodiment described above, there is described the case in which the field current and the armature current are controlled so as not to generate the torque variation. In contrast, the field current and the armature current may be controlled so as not to generate a variation in direct current IDC. In this case also, it is possible to attain the object of the present application of suppressing an abrupt torque variation during the mode switching and performing the mode switching quickly as compared to the related-art technology as a result.

Moreover, in the second embodiment, the case in which the field current command value during the mode switching is changed in accordance with the time constant of the field winding, but the present invention is not limited to such field current control. The effect of causing no delay between the field current command value and the field current can be obtained also by performing the control on the current supply amount for the field circuit and the vector control on the current supply amount for the armature winding by preventing the field current from becoming zero, instead of changing the field current command value in accordance with the time constant of the field winding during the mode switching.

Alternatively, the effect of causing no delay between the field current command value and the field current can be obtained also by performing the control on the current supply amount for the field winding so as to fix the field current to a constant value, and then performing the vector control on the current supply amount for the armature winding, instead of changing the field current command value in accordance with the time constant of the field winding during the mode switching.

REFERENCE SIGNS LIST

101 internal combustion engine for vehicle, 102 electric generator/motor, 103 battery (or capacitor), 200 dynamo-electric machine, 201 armature winding, 202 field winding, 203 rotational position sensor, 210 energization control unit, 220 bridge circuit, 223a to 223c upper-arm switching element, 224a to 224c lower-arm switching element, 225a to 225c upper-arm diode, 226a to 226c lower-arm diode, 227a to 227c armature current sensor, 230 field circuit, 231, 232 field circuit switching element, 233 field current sensor

The invention claimed is:

1. A control device included in an electric generator/motor, which includes an armature winding and a field winding, the control device comprising:
   a bridge circuit, which includes a switching element in a positive-side arm and a switching element in a negative-side arm to energize the armature winding;
   a field circuit configured to energize the field winding; and
   an energization control unit configured to control the energization of the bridge circuit and the field circuit,
   the electric generator/motor having two modes including a generation mode of generating electricity by being supplied with torque to supply electric power to charge a battery, and a drive mode of generating drive torque by being supplied with electric power from the battery to restart and assist an engine,
   the energization control unit being configured to perform, when performing mode switching between the generation mode and the drive mode, control on a current supply amount for the field winding, and vector control on a current supply amount for the armature winding to continuously supply a current to the armature winding so as to compensate for a variation in field current flowing through the field winding.

2. The control device according to claim 1, wherein the energization control unit is configured to perform, when performing the mode switching, the control on the current supply amount for the field winding, and the vector control on the current supply amount for the armature winding by changing a field current command value in accordance with a time constant of the field winding.

3. The control device according to claim 1, wherein the energization control unit is configured to perform, when performing the mode switching, the control on the current supply amount for the field winding, and the vector control on the current supply amount for the armature winding by preventing the field current from becoming zero.

4. The control device according to claim 1, wherein the energization control unit is configured to perform, when performing the mode switching, the control on the current supply amount for the field winding so as to fix the field current to a constant value, and the vector control on the current supply amount for the armature winding.

5. A control method for an electric generator/motor, the control method being applied to controlling a wound-field electric generator/motor including an armature winding and a field winding, and being used in executing switching control between two modes by an energization control unit, the two modes including a generation mode of generating electricity by being supplied with torque to supply electric power to charge a battery, and a drive mode of generating drive torque by being supplied with electric power from the battery to restart and assist an engine, the control method comprising, when mode switching is performed between the generation mode and the drive mode in the energization control unit:
   a first step of executing control on a current supply amount for the field winding; and
   a second step of performing, along with the control in the first step, vector control on a current supply amount for the armature winding to continuously supply a current to the armature winding so as to compensate for a variation in field current flowing through the field winding.

* * * * *